Jan. 27, 1959
G. R. McCORMICK
2,871,023
LATHE SPINDLE STOP
Filed Sept. 3, 1957
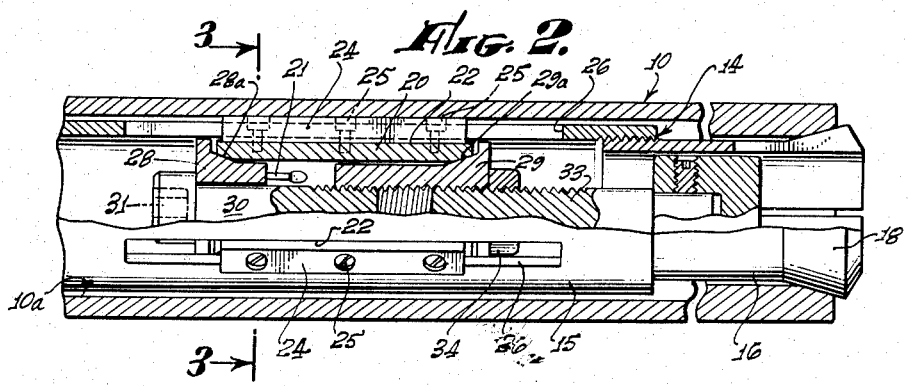
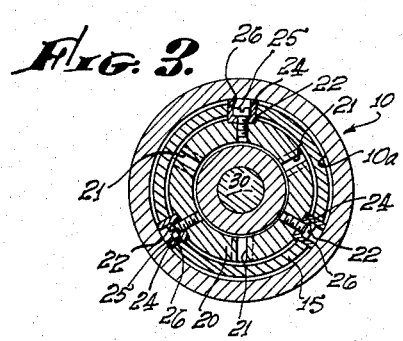
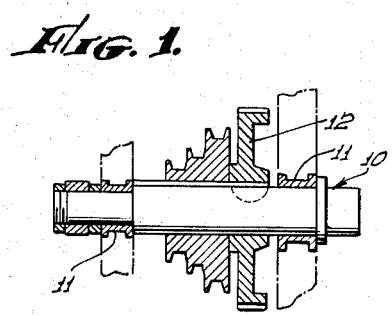
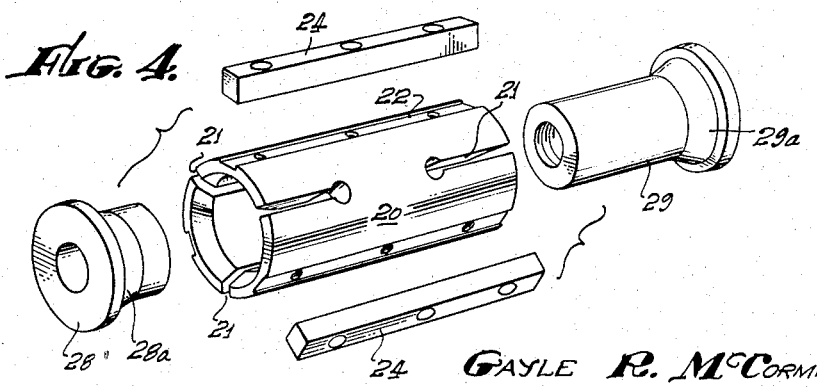
GAYLE R. McCORMICK,
INVENTOR.
BY
Knight & Rodgers
ATTORNEYS.

United States Patent Office 2,871,023
Patented Jan. 27, 1959

2,871,023
LATHE SPINDLE STOP

Gayle R. McCormick, North Hollywood, Calif.

Application September 3, 1957, Serial No. 681,829

2 Claims. (Cl. 279—51)

The present invention relates generally to lathe parts, and more particularly to a spindle stop designed for use in conjunction with a draw-type collet closure.

Stops of known designs now in use with spindles are located within the collet. Since they expand into engagement with the collet tube in order to locate the stop relative to the spindle, stops of this type move longitudinally with the draw tube and the collet jaws. This structure results in certain inherent inaccuracies in work which cannot be tolerated when very close dimensions must be adhered to. It will be appreciated that the longitudinal movement imparted to the collet to grip the work piece depends upon the diameter of the work piece being held in the collet; and as the diameter of this work piece varies, it influences the extent of longitudinal motion of the collet and therefore the final position of the stop itself. As a result, any variations in diameter of several workpieces held in the collet can change the final position of the stop and therefore of the surface cut by the lathe tool. These inaccuracies are particularly pronounced in the case of radial shoulders; and it often happens that variations in the diameter of the work piece are so great that the shoulders cannot be held within the close tolerances required for precision machining.

It thus becomes a general object of my invention to design a spindle stop for use in conjunction with drawtube collets that maintains a fixed position with respect to the spindle and therefore with respect to the cutting tool, so that the work piece can be machined with a higher degree of accuracy than has heretofore been possible.

This object is achieved according to my invention by locating the stop inside the hollow draw tube which is attached to the collet, and providing means whereby the stop can be anchored to the inside of the bore extending through the spindle. This is accomplished by providing longitudinally extending slots in the collet draw tube through which project a number of shoes or other anchoring elements attached to an expansible sleeve. Means within the sleeve expands the sleeve and the attached shoes into engagement with the inside wall of the spindle thus anchoring the stop in a fixed position with respect to the spindle. At the same time the draw tube and collet are free to move longitudinally within the spindle throughout a range of movement which is limited only by the length of the longitudinal slots in the tube and through which the shoes project.

How the above and other objects and advantages of my invention, as well as others not specifically mentioned herein, are attained, will be better understood by reference to the following description, and to the annexed drawing, in which:

Fig. 1 is a diagrammatic view of the headstock of the lathe with the spindle mounted therein;

Fig. 2 is an enlarged longitudinal median section through a portion of the spindle removed from the headstock;

Fig. 3 is a transverse cross-section on line 3—3 of Fig. 2; and

Fig. 4 is an exploded perspective showing the internal sleeve, the anchor shoes, and the expansion means for anchoring the stop in place.

Referring now to the drawing, there is shown in Fig. 1 the headstock of a lathe in which is mounted the hollow spindle 10 to be rotated in bearings 11 by gear 12 or other suitable means. The gear is typically keyed to the spindle.

As may be seen clearly in Fig. 2, the spindle is hollow, having a bore 10a that extends longitudinally for the full length of the spindle. Within this bore is located an assembly 14 which includes draw tube 15 which is connected at one end to work-holding collet 16 in a suitable manner, as by a threaded joint. The collet extends forwardly beyond the spindle and is adapted to receive internally a work piece (not shown) to be held in the collet, in a well-known manner. The collet is clamped on the workpiece by moving the collet, by means of the draw tube, longitudinally within the spindle in order to close the jaws of the collet. An annular inclined surface on the forward end of the spindle engages a similarly inclined annular surface 18 on the exterior of the collet jaws, moving the jaws inwardly as they also move longitudinally.

Draw tube 15 is itself hollow, having a central bore extending for the full length of the tube. Mounted within the tube is sleeve 20, which, as may be seen in Fig. 4, is formed in much the same way as a collet since it is provided at each end with longitudinally extending slots 21, preferably three in number, which allow end portions of the sleeve to be expanded to a diameter larger than their normal diameter. On the external surface of the sleeve, there is milled a plurality of equi-angularly spaced grooves 22 in each of which is located a longitudinally extending bar or anchor shoe 24. The shoes 24 are secured to the sleeve by means of recessed screws 25 that may be seen in Fig. 2.

Draw tube 15 is provided with three equi-angularly spaced, longitudinally extending slots 26. In each one of the slots 26 is located a shoe 25, the slots being wide enough to take a shoe with a sliding fit. The slots are preferably somewhat longer than the shoe and may be made as long as desired in order that draw tube 15 may have a substantial range of longitudinal movement with respect to the shoes. The normal diameter of sleeve 20 is substantially the same as the internal diameter of the bore in tube 15; and the radial thickness of shoes 24 is such that when mounted upon the sleeve, the assembly slides easily into the internal bore within spindle 10.

In order to anchor the sleeve in place, means are provided to expand the sleeve and thereby move the shoes into engagement with the internal surface of the spindle, locking the sleeve in place with respect to the spindle. Such expansion means takes the form here of a pair of core members 28 and 29 which fit within sleeve 20 and are each provided with a frusto-conical surface 28a and 29a respectively which engage correspondingly inclined conical surfaces at each end of the sleeve. Core member 28 has an axially extending smooth bore while plug 29 has a corresponding axial bore that is threaded. Through these two core members extends bolt 30 provided with a forward threaded portion which engages the internal threads in plug 29. The head end of bolt 30 is provided with a socket at 31 to receive a wrench by means of which the bolt may be rotated. In this way, the bolt can be screwed into the forward member 29, drawing closer to it the rear member 28 and by the camming action which these two core members exert upon sleeve 20, the sleeve is expanded sufficiently to bring the shoes 24 into firm locking engagement with the internal surface of spindle 10.

Pad 30 is located within assembly 14. It is normally within the collet 16, as shown in Fig. 2, but may be behind the collet and inside tube 15. This pad has a forward end face which engages a workpiece inserted into the collet and by this engagement positions the work piece longitudinally of the collet and spindle. Pad 30 may be mounted upon the anchor means in any suitable manner; but I prefer to mount it on the forward end of carrier bolt 33 having a shoulder against which the pad seats and which is threaded at the other end to be received in the threaded bore of core member 29. This construction provides a range of adjustability between the stop pad and the position of the anchor means and allows the pad to be easily changed. The carrier bolt can be secured in any adjusted position by tightening lock nut 34, which is threaded on to the bolt, against the head of core member 29.

The operation of my improved stop will be largely self-evident from the foregoing description. It is assembled by placing the pad on the front end of the pad carrier and mounting both these members on the forward core member 29. The two core members may then be inserted in sleeve 20 and held loosely together by screwing bolt 30 into the forward core member. This assembly is then inserted in the draw tube and grooves 20 are brought into registration with slots 26 of the draw tube. Next, shoes 24 are placed in the slots and fastened to the sleeve by screws 25.

The tube with the stop in it may now be inserted in the spindle in the usual manner. Collet 16 may now be screwed into the end of tube 15. It can be anchored in place by inserting a wrench in socket 31 and turning bolt 30 in a direction to draw the two core members 28 and 29 together, thus expanding sleeve 20 and bringing shoes 24 into anchoring engagement with inner bore 10a of the spindle. With the stop anchored in place, collet 14 may be closed in the usual manner by draw tube 15 to grip a work piece. It will be noted that the collet may move longitudinally with respect to pad 30, while the work piece is held in a fixed position with respect to the spindle and, therefore, with respect to the lathe tool.

It will be evident that various changes may be made in the arrangement and construction of my improved spindle stop without departing from the spirit and scope of my invention. Accordingly, the foregoing description is considered to be illustrative of, rather than limitative upon, the appended claims.

I claim:

1. A work piece stop for use in combination with a hollow lathe spindle, comprising: an assembly consisting of a collet, having work engaging jaws, and a draw tube longitudinally movable within the spindle to close the collet jaws against the work piece by movement relative to the spindle, said tube having openings in its walls; a stop within the assembly for positioning the work piece; and anchor means projecting through the openings in the draw tube into engagement with the spindle to secure the stop at a predetermined position relative to the spindle.

2. A work piece stop for use in combination with a hollow lathe spindle comprising: an assembly consisting of a collet having work engaging jaws and a draw tube longitudinally movable within the spindle to close the collet jaws against the work piece by movement relative to the spindle, said tube having openings in its walls; a stop within the assembly for positioning the work piece; an expansible sleeve within the draw tube; shoes mounted on the sleeve and projecting through the openings in the draw tube to engage the spindle; means for expanding the sleeve to anchor it to the spindle at selected positions; and means mounting the stop on the sleeve.

References Cited in the file of this patent

UNITED STATES PATENTS

| | | |
|---|---|---|
| 1,014,773 | Rivett | Jan. 16, 1912 |
| 2,469,160 | Evans | May 3, 1949 |
| 2,698,754 | Bernstein | Jan. 4, 1955 |